United States Patent [19]

Tate

[11] Patent Number: 5,123,044
[45] Date of Patent: Jun. 16, 1992

[54] PROTECTIVE COVER FOR A MOBILE TELEPHONE

[76] Inventor: Marc B. Tate, P.O. Box 2797, Fontana, Calif. 92335

[21] Appl. No.: 462,756

[22] Filed: Jan. 10, 1990

[51] Int. Cl.⁵ ............................................. H04M 1/00
[52] U.S. Cl. .................................. 379/451; 379/452; 455/90
[58] Field of Search ............... 379/451, 452, 455, 440; 455/90, 347, 351; 381/189

[56] References Cited

U.S. PATENT DOCUMENTS 2,554,081  5/1951  Allen et al. ........................ 379/447
3,052,887  9/1962  Sockel et al. ...................... 379/451
3,872,235  3/1975  Manly, Jr. ........................... 455/347
3,962,555  6/1976  Efaw ................................... 379/451

Primary Examiner—Jin F. Ng
Assistant Examiner—Jason Chan
Attorney, Agent, or Firm—Leon Gilden

[57] ABSTRACT

A potective cover for a mobile telephone may include inflatable chambers to improve resistance to damage. Additionally, interchangeable inflatable ear pads are utilizable with the cover. The cover may include ribbed inflatable chambers of varying rigidity to provide a combination of comfort and damage protection.

10 Claims, 4 Drawing Sheets

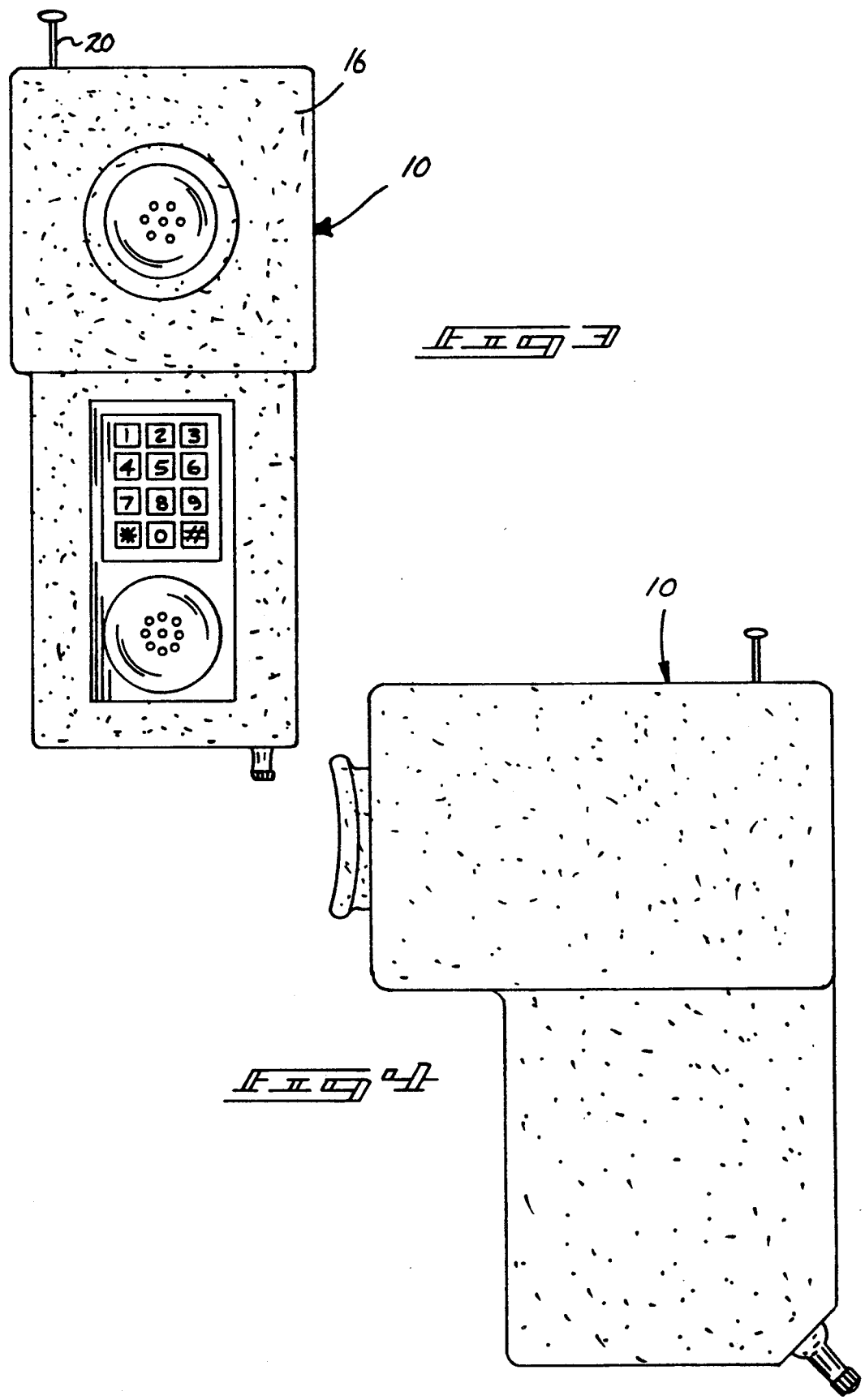

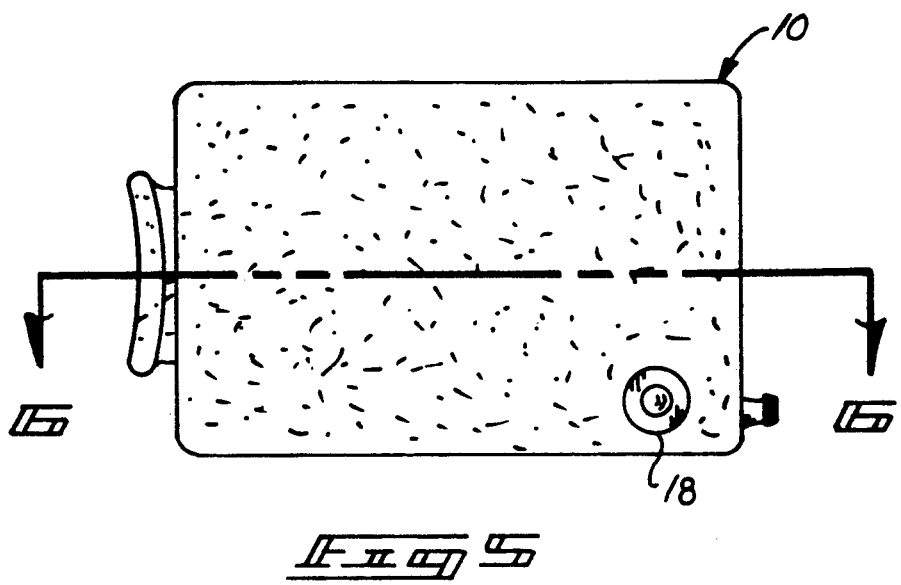
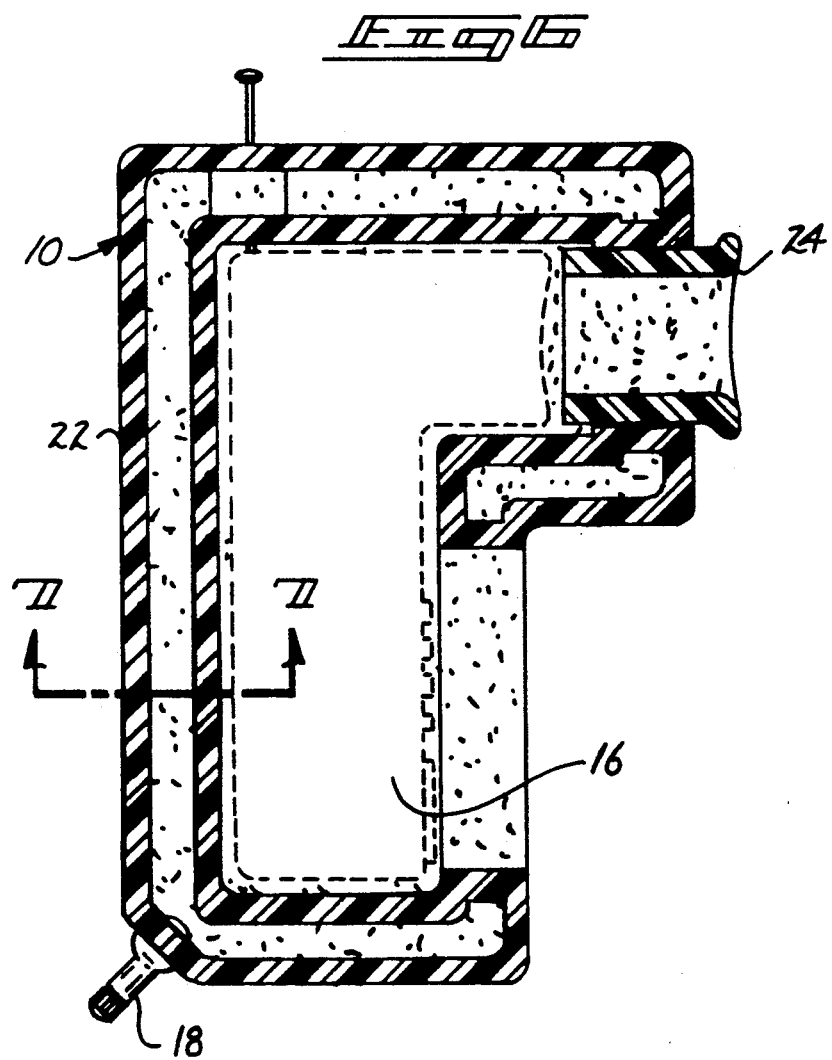

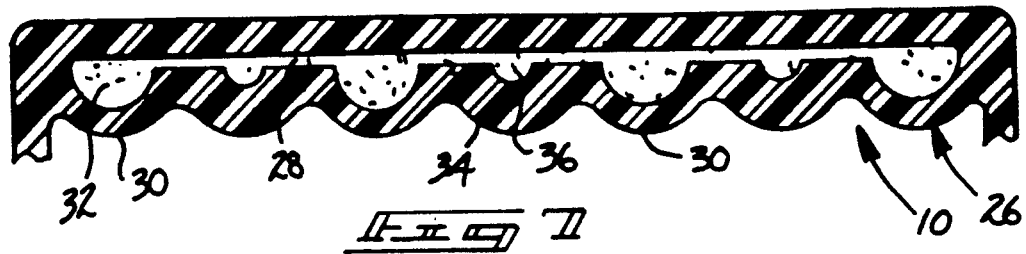
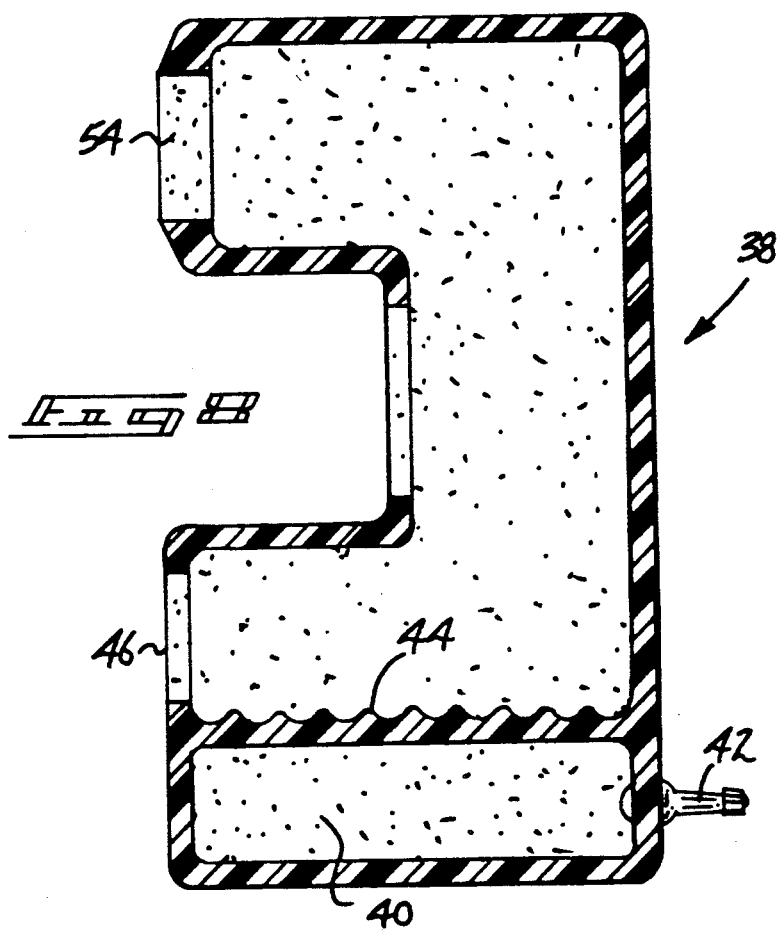
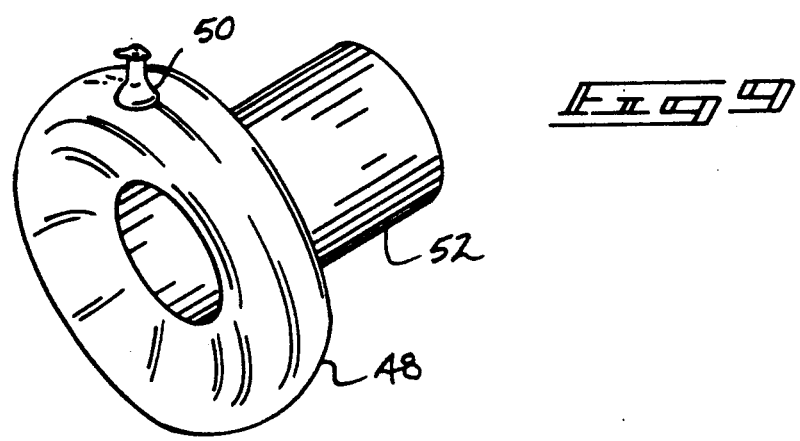

PROTECTIVE COVER FOR A MOBILE TELEPHONE

BACKGROUND OF THE INVENTION

1. Field of the Invention

The present invention relates to protective covers, and more particularly pertains to a protective inflatable cover positionable over a mobile telephone.

2. Description of the Prior Art

The use of protective covers over telephones is well known in the prior art. For example, U.S. Pat. No. 3,962,555, which issued to D. Efaw on June 8, 1976, discloses a guard for a handset telephone wherein such guard is constructed in the manner of a "rubber overshoe." The rubber guard is designed to cover both the mouthpiece and the receiver, as well as a portion of the handle, and is primarily intended to prevent the spread of germs both to and from the receiver and mouthpiece of a telephone.

While being functional for its intended purpose, it can be appreciated that the Efaw guard requires precise manufacturing details and tolerances to conform to a variety of different telephone styles now available in the commercial market. Inasmuch as this described guard does not appear to be commercially available, it is quite likely that the expense of manufacturing so many different styles to accommodate a huge variety of telephone handset designs has prevented its introduction into the market place. As such, there would appear to be a need for some type of protective telephone handset cover which could be easily adapted to fit a variety of different designs and styles of telephone handsets, and in this respect, the present invention substantially fulfills this need.

SUMMARY OF THE INVENTION

In view of the foregoing disadvantage inherent in the known types of telephone handset covers now present in the prior art, the present invention provides an telephone handset cover which allows the use of a stranded size cover to accommodate the protective covering needs of a variety of different handset designs and styles. As such, the general purpose of the present invention, which will be described subsequently in greater detail, is to provide a new and improved telephone handset cover which is particularly well adapted for use with mobile telephone sets and which has all the advantages of the prior art telephone handset covers and none of the disadvantages.

To attain this, a protective cover for a mobile telephone may include inflatable chambers to improve resistance to damage. Additionally, interchangeable inflatable ear pads are utilizable with a cover. The cover may include ribbed inflatable chambers of different rigidity to provide a combination of comfort and damage protection.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is intended to be limiting as to the scope of the invention in any way.

It is therefore an object of the present invention to provide a new and improved protective cover for a telephone handset which has all the advantages of the prior art protective covers for a telephone handsets and none of the disadvantages.

It is another object of the present invention to provide a new and improved protective cover for a telephone handset which may be easily and efficiently manufactured and marketed.

It is a further object of the present invention to provide a new and improved protective cover for a telephone handset which is of a durable and reliable construction.

An even further object of the present invention is to provide a new and improved protective cover for a telephone handset which is susceptible of a low cost of manufacture with regard to both materials and labor, and which accordingly is then susceptible of low prices of sale to the consuming public, thereby making such protective covers for telephone handsets economically available to the buying public.

Still yet another object of the present invention is to provide a new and improved protective cover for a telephone handset which provides in the apparatuses and methods of the prior art some of the advantages thereof, while simultaneously overcoming some of the disadvantages normally associated therewith.

Still another object of the present invention is to provide a new and improved protective cover for a telephone handset which utilizes inflatable chambers to achieve a conforming fit over most designs and shapes of conventional handsets.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevation view of the present invention operably installed over a mobile telephone handset.

FIG. 4 is a side elevation view of the handset shown in FIG. 3.

FIG. 5 is a top plan view of the handset.

FIG. 6 is a cross-sectional view of the handset and cover as viewed along the lines 6—6 in FIG. 5.

FIG. 7 is a cross-sectional view of the protective cover as viewed along the line 7—7 in FIG. 6.

FIG. 8 is a cross-sectional view of a modified embodiment of the present invention.

FIG. 9 is a perspective view of an inflatable, exchangeable earpiece forming a part of the present invention.

DESCRIPTION OF THE PREFERRED EMBODIMENTS

Figure 1:
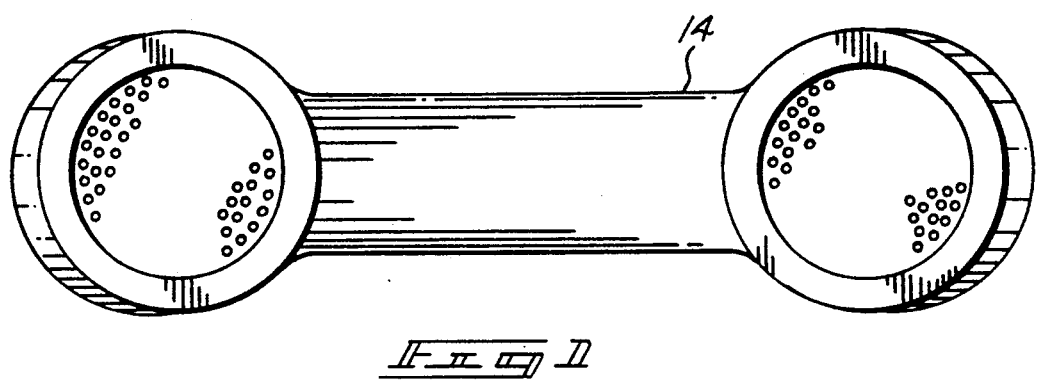
FIG. 1 is a plan view of a prior art telephone handset having a protective guard attached thereto.

With reference now to the drawings, a new and improved protective cover for a telephone handset embodying the principles and concepts of the present invention and generally designated by the reference numeral 10 will be described.

Figure 2:
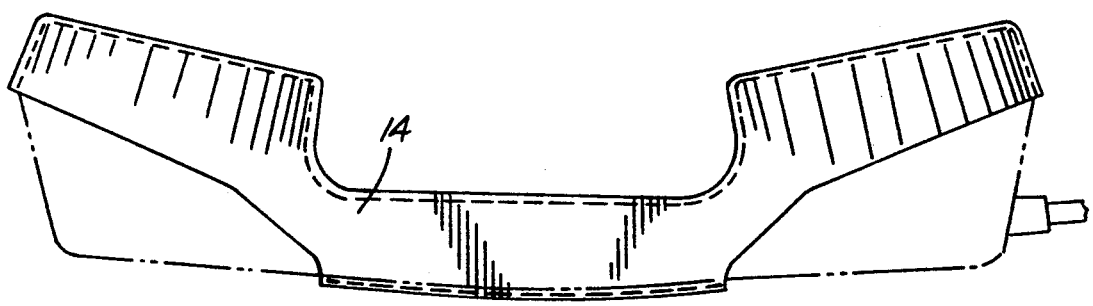
FIG. 2 is a side elevation view of the telephone handset shown in FIG. 1.

More specifically, it should be initially noted that protective covers for telephone handsets are known in the prior art. In this regard, reference is made to FIGS. 1 and 2 of the drawings wherein the protective cover for a telephone handset disclosed in U.S. Pat. No. 3,962,555 is illustrated. As shown, a conventional telephone handset 12 has attached thereover a flexible rubber protective cover 14. As is apparent, the cover 14 is stretched fitted over the handset 12 and must be substantially similarly shaped to the handset prior to its attachment thereto. The cover 14 is representative of prior art telephone handset covers and is most likely not commercially feasible inasmuch as so many different shapes of covers would have to be manufactured to accommodate the wide variety of telephone handset designs and shapes now available to the consuming public.

FIGS. 3, 4, and 5 illustrate the basic concept of the present invention. In this regard, a preferred embodiment 10 of the invention would comprise a soft protective cover which is designed to be resiliently fitted over a mobile telephone handset. As illustrated in FIGS. 3-5, the protective cover 10 would totally encase a mobile telephone handset 16 with the exception that the receiver, keyboard, antenna and mouthpiece would be exposed. Accordingly, an opening 18 would be provided for the antenna 20 on a top portion of the cover 10, while appropriate openings would also be provided for the other aforementioned handset components.

FIG. 6 illustrates the inflatable construction associated with a first embodiment of the handset cover 10. In this regard, the cover 10 would substantially cover the telephone handset 16, and an air valve 18 would facilitate an inflation of the cover. In this regard, a double walled construction for the cover 10 would provide an air chamber 22 with which the air valve 18 would be in fluid communication. Due to the inflatable construction of the cover 10, it can be appreciated that the cover could be made substantially larger than the telephone handset 16, i.e., it would not have to be expensively designed and manufactured to facilitate a conforming fit, inasmuch as after its installation over the handset, the inflation thereof would cause the interior portion of the cover to expand into a gripping contact with the handset. Depending upon the resilience of the cover 10, even a greater expansion of the air chamber 22 could be accomplished to facilitate a greater range of conforming fits with the various designs and shapes of telephones now commercially available.

Also of interest in FIG. 6 is the construction of the integral foam ear pads 24 which are designed to act both as a sound amplification chamber and a comfortable padding means for the user. While an integral construction of ear pad 24 is shown in the cover 10 illustrated in FIG. 6, it is within the intent and purview of the present invention to include removable and variously shaped are pads similar to the construction which will subsequently be described with reference to FIG. 9.

FIG. 7 of the drawings illustrated a modified wall construction for the cover 10 wherein it can be seen that the cover wall may include a plurality of elongated inflatable chambers 26. These chambers effectively define and appear as ribs and are fluidly interconnected by small apertures 28. Accordingly, air delivered through the air valve 18 operates to fill and expand each of the ribs 26 due to the fluid communication established therebetween by the apertures 28. Recognizing the need for rigidity in the cover 10, as well as the need for inflatable expansion to accommodate variously sized telephone handsets 16, alternate ribs 26 are modified to accommodate these mutually exclusive needs. More particularly, every other rib 26 is provided with thin stretchable walls 30 and a large inflation camber 32. In between ribs 26 include very thick wall portions 34 and quite small inflation chambers 36. As the air pressure is increased within the ribs 26, those ribs having thin walls 30 and large expansion chambers 32 will expand to a much greater diameter than those ribs having thick walls 34 and small expansion chambers 36. Accordingly, the ribs 26 having the thin walls 30 will operate to fixedly grip and retain a telephone handset 16 while losing their supporting rigidity due to the stretching of their thin walls. However, this loss of rigidity is compensated for by the ribs 26 which have thick walls 34 inasmuch as they experience virtually no expansion so as to maintain a preselected rigidity and level of support for the complete cover 10.

FIG. 8 illustrates a further modified embodiment of the invention which is generally designated by the reference numeral 38. More specifically, the cover 38 shown in FIG. 8 has an inflatable section 40 positioned on a bottom portion thereof while the rest of the cover is substantially similar to that shown in the prior art representation of FIGS. 1 and 2. An air inflation valve 42 can be utilized to inflatably expand the air chamber 40, and an interior wall of the cover 38 is provided with a plurality of molded, upstanding rubber ribs 44 which press against a handset 16 retained within the cover. The ribs 44 serve to hold the handset 16 in position after the chamber 40 is expanded, i.e., they prevent the handset from sliding backwards and forwards relative to the mouthpiece opening 46.

FIG. 9 of the drawings illustrates one of many different designs which could be utilized for removable inflatable earpieces 48. Each earpiece 48 could include a small inflation valve 50 so as to facilitate an inflation thereof to a desired softness or rigidity, and an integral or otherwise separably attached extension member 52 would be designed to slide into the ear opening 54 illustrated in FIG. 8. In a preferred embodiment, the extension 52 would also be inflatable so as to facilitate a friction fitting of the extension within the opening 54. This friction fitting would be accomplished by inflating the earpiece 48 after the extension has been inserted in the opening 54.

With respect to the manner of usage and operation of the present invention 10, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operations, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A new and improved protective cover for a telephone handset, said handset cover comprising:
   cover means positionable over said handset, said cover means including an inflation chamber therein; and
   inflation means for inflating said cover means into a conforming fit around said telephone handset, said inflation means including a manually operable inflation valve.

2. The new and improved protective cover for a telephone handset as described in claim 1, wherein said inflation chamber is defined by a double walled construction of said cover means.

3. The new and improved protective cover for a telephone handset as described in claim 2, wherein said double wall construction includes a plurality of inflatable aligned ribs fluidly interconnected by a plurality of small apertures.

4. The new and improved protective cover for a telephone handset as described in claim 3, wherein said ribs are manufactured with varying wall thicknesses, thereby to affect the degree of expansion therebetween in response to increased air pressure within said inflation chamber.

5. The new and improved protective cover for a telephone handset as described in claim 4, wherein alternating ribs are provided with thin walls and in between ribs are provided with thick walls, said thin walled ribs expanding to a much greater degree than said thick walled ribs, whereby said thin walled ribs effect a conforming gripping engagement with said telephone handset and said thick walled ribs provided rigidity to said cover means after said cover means is fully inflated.

6. The new and improved protective cover for a telephone handset as described in claim 2, wherein said inflation chamber is positioned along a bottom portion of said cover means.

7. The new and improved protective cover for a telephone handset as described in claim 6, wherein a handset engaging wall of said inflation chamber is provided with a plurality of upstanding rubber ribs, thereby to prevent handset slippage within said cover means after said inflation chamber is fully inflated.

8. The new and improved protective cover for a telephone handset as described in claim 2, and further including exchangeable earpiece means, said exchangeable earpiece means being removable from and engageable with said cover means.

9. The new and improved protective cover for a telephone handset as described in claim 8, wherein said exchangeable earpiece means is of an inflatable construction.

10. The new and improved protective cover for a telephone handset as described in claim 9, wherein said exchangeable earpiece means includes an extension member positionable within an aperture formed in said cover means, said extension member being selectively inflatable into engagement with said aperture.

* * * * *